United States Patent [19]

Pagani

[11] 4,079,749
[45] Mar. 21, 1978

[54] SAFETY VALVE OF RUBBER OR THE LIKE SUITABLE TO BE VULCANIZED ON INFLATABLE ARTICLES

[76] Inventor: Ezio Pagani, Via Degli Albani, 17, Bergamo, Italy

[21] Appl. No.: 700,258

[22] Filed: Jun. 28, 1976

[30] Foreign Application Priority Data

Jun. 30, 1975 Italy .................................. 24939 A/75

[51] Int. Cl.² ............................................ F16K 17/04
[52] U.S. Cl. .................................. 137/484.2; 137/316; 137/527.6
[58] Field of Search ............... 137/224, 226, 234, 316, 137/484.2, 527, 527.6, 527.8, 855, 856, 857

[56] References Cited

U.S. PATENT DOCUMENTS

| 826,404 | 7/1906 | Cody | 137/316 X |
| 3,013,579 | 12/1961 | Gilliam | 137/527 X |
| 3,426,787 | 2/1969 | Fuller | 137/226 |
| 3,716,070 | 2/1973 | Klimkiewicz | 137/484.2 |
| 3,815,629 | 6/1974 | Oberholtzer | 137/527.8 |

Primary Examiner—Robert G. Nilson
Attorney, Agent, or Firm—Kenneth D. Tremain

[57] ABSTRACT

Safety valve coated or covered with rubber or the like, suitable to be vulcanized or sealed to inflatable articles, comprising a metal cap hinged or pivoted at one end thereof, which is pressed by a resilient member against a valve seating so as to provide for a sealing until the inner pressure in the inflatable article exceeds a determined rate defined by the resilient member. A top baffle is also provided for protecting the valve, adjusting the flow rate thereof and retaining a possible closing wedge.

2 Claims, 5 Drawing Figures

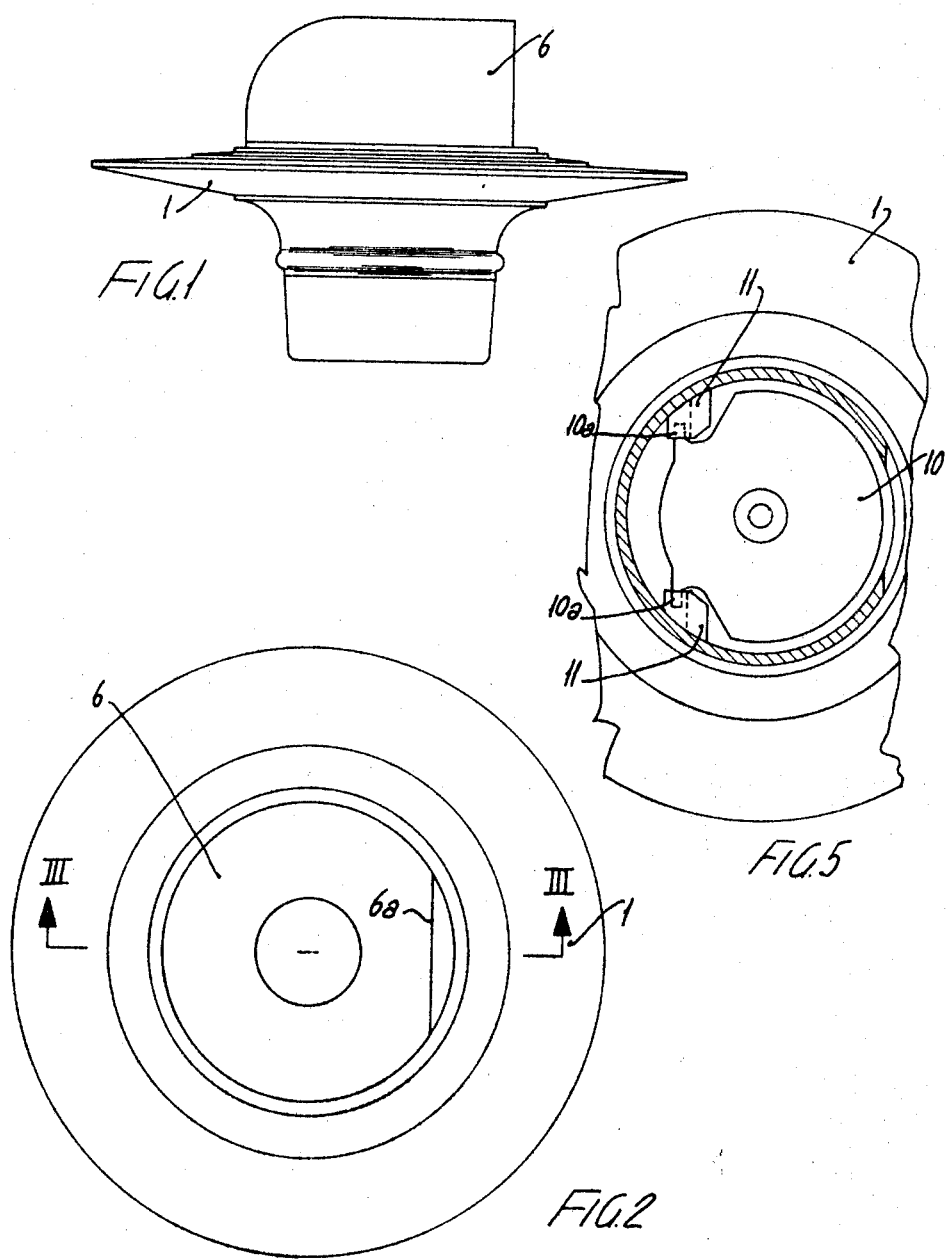

SAFETY VALVE OF RUBBER OR THE LIKE SUITABLE TO BE VULCANIZED ON INFLATABLE ARTICLES

Safety valves normally carried on inflatable articles, such as life rafts or the like, serve the purpose of removing or releasing any increase in pressure. Particularly on life rafts, such a valve is directed to maintain within determined limits the inner pressure of the inflated structure when said pressure would tend to increase or rise due to an increase in outside temperature. Additionally, still referring to these inflatable articles, such a valve serves also the purpose of removing excess carbon dioxide (or similar gas) upon inflation.

A valve according to the present invention has several advantages over safety valves heretofore normally used. Particularly:

(a) rubber or the like, as used in this valve, has all of the inherent advantages of this material; that is, a good tensile strength, tearing resistance, abrasion resistance, permanent deformation resistance, heat and cold resistance, ozone resistance and atmospherical agent resistance and particularly a very good sea water resistance.

(b) rubber (or the like) forming the external lining allows for vulcanisation or sealing to the inflatable article, thereby providing a very good seal for the junction.

(c) the rounded shape, as provided for the valve, does not damage at all the inflatable article when the latter is assembled, collapsed or stored.

(d) the valve, as constructed with a rounded shape and slightly projecting outwardly of the inflatable article, minimizes any possibility of abrasions or bruises to the users of said article.

(e) safety valves, as heretofore used, had a rubber membrane as operating member, the membrane being pressed against the valve seat by means of a spring. This membrane was liable to aging and also had some fragility at low temperatures, thus causing at times gas leakages. A safety valve according to the present invention will obviate the above mentioned drawback, since the operating member is not made of rubber or the like, but of metal sheet.

(f) a safety valve according to the invention has a limited external overall size, while assuring a very good air passage, superior to that heretofore obtained by the other commercially available valves. This limited overall size and good flexibility of rubber or the like permit to apply the valve also to inflated structures having a small diameter.

(g) the valve is of very simple construction, thus providing high reliability in operation and low cost of production.

Preferably, a valve according to the present invention is provided with a baffle means both enabling to protect the valve inside from possible water sprays and highly increasing the valve opening and hence the outlet gas flow rate, since a vacuum will likely be built up within the baffle, promoting the full opening of the cap.

The application of this baffle made of shock-resistance plastic material has also the advantage of protecting the top portion of the valve against possible impacts.

It is a further highly important feature of this baffle to provide a smaller or larger gas flow rate by suitably rotating the baffle relative to the axis or shaft acting as a hinge for the cap.

A safety valve according to the present invention can be also provided with a shaped wedge or rubber plug or the like, so that should the sealing members be damaged, it can be inserted into the baffle, blocking the gas leakage and thus providing for at least the required sealing.

In order that the invention be more clearly understood, a practical embodiment of the invention will now be described. It is to be understood that such an embodiment shall not be construed in a restrictive sense, but is given by mere way of illustrative example.

In the accompanying drawings:

FIG. 1 is a side view of the valve according to the present invention;

FIG. 2 is a top view of the valve shown in FIG. 1;

FIG. 5 is a sectional view taken along line V—V of FIG. 3.

Figure 3:
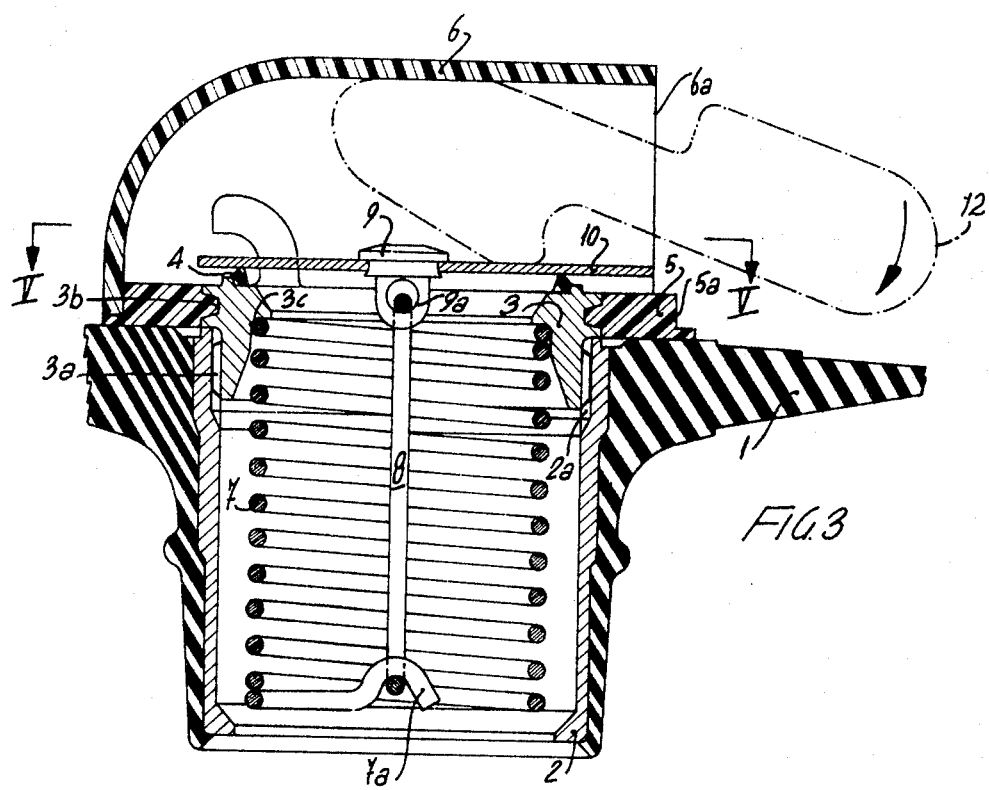
FIG. 3 is an enlarged longitudinal sectional view of the same valve, taken along line III—III of FIG. 2.

Referring to the drawings, it will be seen that a rubber lining 1 encircles the whole hollow brass body 2, the latter having a nearly tubular shape. Said tubular body 2 comprises a threaded inner top portion 2a, into which a ring 3 is threaded, this ring having an outer thread 3a for threading into said thread 2a. A circular rubber gasket 4, which is the sealing member, is vulcanized to the top surface of ring 3.

An annular ring 5, preferably made of plastic material, is molded to the outer side surface 3b of said ring 3.

The outer surface of annular ring 5 is L-shaped, as shown at 5a, and suitable to accomodate a baffle 6 which can be glued or sealed to said annular ring 5. At the top said baffle is flattened and has a circular base for insertion on the entire external periphery 5a of annular ring 5. Baffle 6 has also been perforated to form an aperture 6a for gas outlet.

Said ring 3 also has an inner shoulder 3c having a spring 7 bearing thereagainst, and provided on the other side by a rod 8 hooking at the top to a central portion of cap 10, while being hooked at the bottom to the end 7a of spring 7 opposite to the end bearing on shoulder 3c of ring 3. Valve closing cap 10 bears and seals on sealing gasket 4 of ring 3 and is made of metal material. Centrally of cap 10 a nail 9 is sealingly secured and at the bottom has a hole 9a penetrated by the end of rod 8, acting as a hook and retaining said cap so as to press against sealing gasket 4.

From FIG. 5 it will be seen that cap 10 has two pins 10a entering two hinges 11 suitably secured to the annular plastic edge 5.

Figure 4:
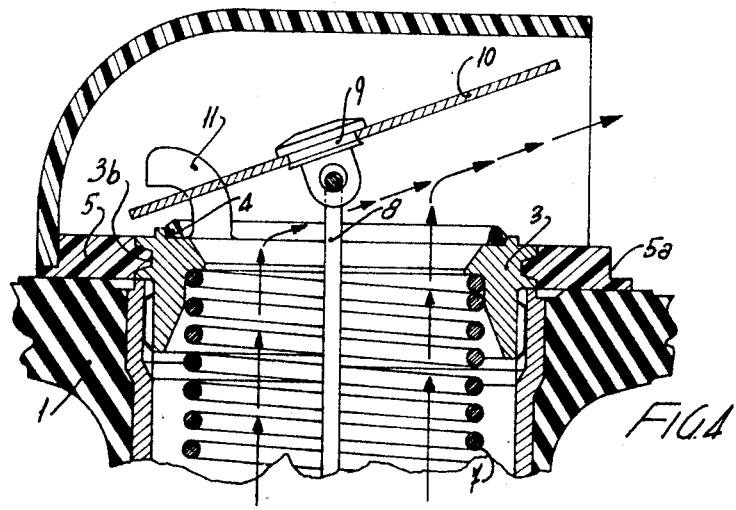
FIG. 4 is a detailed view of FIG. 3, showing the valve cap at open position.

In operation, the valve will remain always closed while the force being exerted by the inner gas pressure on the cap is lower than a given preset rate of the spring. However, as this rate is exceeded, the thrust built up by the pressure on the inner surface of the cap will be such as to compress the spring, opening the valve and exhausting the gas, as shown in FIG. 4. In this case, the function of the baffle is highly advantageous in that in the interior thereof a vacuum is established above the cap, promoting the opening of said cap and thus enhancing the outlet gas flow rate.

It should also be noted that, when mounted, said baffle 6 can be glued or sealed to the plastic ring 5 either at a position to provide a maximum flow rate, or at other positions having same angle relative to the former, whereat the gas outlet is choked.

It will also be appreciated that this baffle 6 is a highly efficient protection for the whole valve body, while not being rigid and not having any overall size disturbing the inflatable article.

Many changes can be made to this type of construction. Particularly, baffle 6 could be directly vulcanized to rubber lining 1, rather than to annular ring 5. Also the type of cap hinge could be varied relative to the system herein shown. Additionally, the position for the spring holding the cap against its own seating can be provided either at the bottom of the cap, that is within the valve body, or at the top of the same. Finally, the coil spring shown can be replaced by another equivalent resilient element.

Additionally, for this type of valve, a further safety element has been provided by supplying therewith a wedge 12 or rubber plug or the like, that can be introduced into the baffle so that, should a misfunction occur due to damages to the sealing member, the valve can be at least manually closed to avoid deflation of the pneumatic article.

What is claimed is:

1. A safety valve covered with rubber or the like and adapted to be vulcanized to an inflatable article, said valve comprising:

a metal valve body;

a metal ring threadedly engaged with said valve body, said ring having a sealing gasket on its top surface and including a shoulder at its interior;

a plastic ring molded to the outer surface of said metal ring;

a metal cap pivoted at its one end and adapted to provide closure of the valve;

a spring connected to said metal cap and bearing against the shoulder of said metal ring so as normally to maintain said cap perpendicularly to the axis of said valve body against said sealing gasket, thereby to provide sealing against the inner pressure of the inflatable article, the force built up by excess pressure on the inner surface of the cap being operative once the force of the spring is overcome to open the valve and cause exhausting of the gas from the inflatable article;

a plastic baffle having an opening, said baffle being joined to said plastic ring and being shaped to have its upper portion, adjacent the opening, substantially parallel to said metal cap so that when a rubber plug or the like is simply inserted into said opening of the baffle, the valve can be kept in the closed position.

2. A valve in accordance with claim 1, in which by varying the baffle position relative to the cap hinge axis, the flow rate of the exiting gas can be varied as required.

* * * * *